United States Patent [19]

Röhm

[11] Patent Number: 4,690,416
[45] Date of Patent: Sep. 1, 1987

[54] POWER CHUCK

[76] Inventor: Günter H. Röhm, Heinrich-Röhm-Strasse 50, 7927 Sontheim, Fed. Rep. of Germany

[21] Appl. No.: 841,558

[22] Filed: Mar. 20, 1986

[30] Foreign Application Priority Data

Mar. 22, 1985 [DE] Fed. Rep. of Germany ....... 3510457

[51] Int. Cl.$^4$ ............................................. B23B 31/02
[52] U.S. Cl. ...................................... 279/110; 279/123
[58] Field of Search ................................ 279/110, 123

[56] References Cited

U.S. PATENT DOCUMENTS

| 2,667,358 | 1/1954 | Highberg | 279/123 |
| 2,919,925 | 1/1960 | Snyder et al. | 279/123 |
| 2,939,197 | 6/1960 | Leven | 279/123 |
| 3,744,808 | 7/1973 | Hughes | 279/123 |
| 4,352,500 | 10/1982 | Blattry et al. | 279/123 |
| 4,593,588 | 6/1986 | Rohm | 82/40 R |

FOREIGN PATENT DOCUMENTS

| 2515800 | 10/1976 | Fed. Rep. of Germany | 279/110 |
| 2949567 | 6/1981 | Fed. Rep. of Germany | 279/110 |
| 3425603A1 | 2/1986 | Fed. Rep. of Germany | |
| 3425609A1 | 2/1986 | Fed. Rep. of Germany | |
| 201706 | 11/1984 | Japan | 279/123 |

Primary Examiner—Gil Weidenfeld
Assistant Examiner—Daniel W. Howell
Attorney, Agent, or Firm—Karl F. Ross; Herbert Dubno

[57] ABSTRACT

The jaws of the chuck include a base jaw and a separate, releasable mounting jaw. These two jaw components are connected by at least one shaft which is guided with male-type screw threads in its one end in female-type screw threads of the base jaw. The other end has a lock head which has a projecting lock shoulder, and which lock head can engage in axial direction into a lock retainer in the mounting jaw, when the shaft has been rotated into the position corresponding to the unlocked condition. When the shaft has been rotated into the position which corresponds to the locked condition, it can engage with its lock shoulder in a dovetail formation in axial and positive locking manner. The shaft is further shaped with gear teeth which can operate in the manner of a pinion. In the apparatus there is also provided a control bolt extending transversely to the axis and guided and adapted to be shifted in its longitudinal direction in the base jaw. The control bolt has transversely extending gear-rack type teeth which can meshingly engage with the teeth of the associated shaft. For shifting of a control bolt there are provided control pieces on either side of a base jaw, and these are guided and moved in their longitudinal direction by means of push rods which are axially guided in the chuck base and which can be actuated from the outside of the chuck base against the force of reset springs disposed in the base. Motive power transmission is by wedge-type transmissions.

11 Claims, 5 Drawing Figures

POWER CHUCK

CROSS REFERENCE TO RELATED APPLICATIONS

The present application is related to my commonly owned copending applications Ser. No. 811,101 filed Dec. 19, 1985 and Ser. No. 811,100 also filed Dec. 19, 1985. Reference may also be had to Ser. No. 637,401 filed Aug. 3, 1984, now U.S. Pat. No. 4,582,331, Ser. No. 633,381 filed July 13, 1984, now U.S. Pat. No. 4,593,588, Ser. No. 580,460, filed Feb. 15, 1984, now abandoned, and Ser. No. 580,461, filed Feb. 15, 1984, now abandoned, and to the applications and patents mentioned therein.

FIELD OF THE INVENTION

My present invention relates to a power chuck having replaceable chuck jaws or workpiece-engaging portions thereof, and it also relates to an apparatus for replacing or exchanging such jaws or workpiece-engaging jaw components of the chuck.

More particularly, the present invention relates to a power chuck having compound clamping jaws. A compound clamping jaw of this chuck can be radially adjusted, and it is typically comprised of a base jaw which is arranged within guide means in the chuck base, and of a mounting jaw i.e. the workpiece gripping elements of the jaw. The base jaws can be actuated or driven by the common operating means. The mounting jaws are respectively provided at the forward end face of the base jaws, and these mounting jaws are secured on the base jaws in such a way that they can be readily exchanged.

A base jaw and its associated mounting jaw are connected by at least one shaft or pin which extends substantially parallel to the longitudinal central axis of the power chuck.

The present invention is furthermore concerned with an apparatus which allows replacing or exchanging of mounting jaws.

BACKGROUND OF THE INVENTION

German Patent document No. 34 25 609 describes a chuck with a mounting jaw having a fixed connecting shaft. This fixed connecting shaft can be introduced into a corresponding opening in the base jaw and, accordingly, this serves as the plug component of a plug-type connection. The connection can be secured, i.e. closed and locked, by locking elements which are slidingly disposed with the base jaw. The locking elements, in turn, are actuated by a position-control drive or similar actuating means in the chuck body.

With respect to construction considerations, such plug-type connections are cumbersome due to the necessary locking elements. Automated exchange or replacement operations for replacing the mounting jaws cannot readily be achieved. Radial repositioning of the mounting jaws on the base jaws is also precluded although it is normally possible, as described, for the chuck of German Patent document No. 34 25 603.

The chuck described in German Patent document No. 34 25 603 includes a base jaw and a mounting jaw which have cooperating teeth in meshing relationship, with the teeth extending in the direction transverse to the direction of operation, i.e. in the direction of the radially directed shifting of the base jaw. The mounting jaw, accordingly, can be shifted in radial direction by means of the engaging teeth, and along the base jaw.

Automated replacement of jaws in this assembly is achieved by way of a slot in the forwardly directed flank or face of the base jaw in which are also formed the teeth thereof. This slot extends in the direction of movement of the base jaw, and it is open towards the mounting jaw. The adjacent mounting jaw is formed with a guide formation or projection which can be inserted into the mentioned slot of the base jaw so that the mounting jaw can be moved longitudinally and in an interfacing relationship with respect to the base jaw.

At least at one of its operative ends, the guide projection of the mounting jaw is provided with at least one lock shoulder which cooperates with an adjustable and matching lock element including a lock head provided at the base jaw.

The lock head of the lock element can assume a position in which it is disengaged from the guide formation of the mounting jaw, and it can also be moved transversely with respect to the direction in which the base jaw is moved and guided, to be positioned onto the lock shoulder. When the lock head has been positioned it is in contact with the lock shoulder at an interface which is inclined in the direction opposite to the direction of engagement or locking. When moving over and along this inclined interface for being positioned on the lock shoulder, the lock head pulls or advances the guide formation into the slot of the base jaw.

When considered in the direction of adjustment, the lock element is subjected to the force of a lock spring which holds it against the guide projection. A push rod which can be actuated from the exterior of the chuck presses the lock element against the force of the lock spring into the unlocked position.

Even these solutions leave much to be desired, particularly with respect to the configuration of the lock element, with respect to the engagement thereof at the lock retention, as well as with respect to attendant operational requirements.

It is also of detriment in all cases that the securing of the mounting jaw and the base jaw, and tensioning or tightening them is effected solely by a single connecting element, e.g. a lug or guide protection, and this is not sufficient to ensure positive engagement and strong joining of the jaw components. This applies particularly in the case of mounting jaws and base jaws which have large dimensions in the radial direction of the chuck assembly, and/or when these jaw components are to be shifted over relatively long adjustment distances.

OBJECTS OF THE INVENTION

It is an object of the present invention to provide a chuck as briefly described in the foregoing which allows a substantially automatic exchange or replacement of jaw components.

It is also an object of the invention to provide a chuck which is of simple design and which can be easily assembled.

It is further an object of the invention to provide a chuck which can achieve a more positive and secure joining of base jaws and mounting jaws.

It is still another object of my invention to provide a chuck which allows radial movements of a mounting jaw at and with respect to the associated base jaw.

It is also an object of the invention to provide a chuck in which the effective reach or diameter of the chuck can be selectively varied without a corresponding change of the base jaw.

It is further an object of the invention to provide a chuck which allows selection of chucking distances from a wider range.

Another object of my invention is to provide an apparatus for replacing or exchanging chuck jaws.

SUMMARY OF THE INVENTION

These and other objects are attained in accordance with the invention by providing the element which operatively joins the mounting jaw at the base jaw of the chuck as a shaft which has male-type screw threads at one end for guiding it in matching female-type screw threads of the base jaw.

The other end of the connecting or joining element is formed with a lock head. This lock head end is relatively narrow, but it is wider in the direction or plane transverse to the narrow sides. The lock head also provides a lock shoulder which extends outwardly above the outline of the shaft. The lock head can engage into a lock formation or lock retainer in the mounting jaw.

When the shaft has been rotated to unlock the lock assembly, the lock head can be axially inserted into the lock retainer.

When the shaft has assumed the position corresponding to the locked position, the lock head can engage with its lock shoulder in a dovetail formation of the lock retainer and this engagement can be done in axial direction and to achieve a positive locking.

The shaft, furthermore, is formed, in its portion which extends in the base jaw, with a section having gear-type teeth which can operate in the manner of a pinion.

In accordance with another aspect of the invention, the assembly also includes a control pin or control bolt which extends transversely to the longitudinal axis of the shaft. This control bolt is guided in and adapted to be shifted in the longitudinal direction in the base jaw. The control bolt has teeth of the type of a gear rack, and these are arranged so as to be able to operatively engage in and cooperate with the matching teeth of the shaft which connects the base jaw and the mounting jaw.

In the direction of its displacement, the length of the control bolt is at most equal to the width of the base jaw in the displacement direction of the control bolt.

Movements of a control bolt in its chuck base are achieved by control pieces or bars disposed on either side of the base jaw. The control pieces are aligned with respect to the associated control bolt in its direction of displacement, and they can also be moved in the longitudinal direction.

The movement of the control pieces is effected by way of push rods which are axially guided in the chuck base. The push rods are maintained under spring pressure by coil springs which are attached to chuck elements not forming a direct part of the chuck base. The control pieces are linked to the push rods by means of wedge-type transmission or connection elements or formations.

The axial introduction of the push rods into the chuck base against the force of the associated springs serves to effect shifting of the control bolt. Due to the associated rotation of the shaft, the mounting jaw will be locked or unlocked.

When rotating the shaft in the direction towards locking, it will secure or tightly connect, due to its axial tightening movement in the female-type screw threads, the mounting jaw and the base jaw. When this occurs, the lock shoulders come to rest behind and in contact with the respective flanks of the dovetail formation in the lock retainer or formation.

The push rods which serve to lock and unlock are positioned at opposing sides or flanks of a respective jaw and can not be confused with respect to their operation during the automatic exchange of jaws.

The control bolts are positioned fully within the base jaw in the locked condition, and they will not impede the radially directed jaw adjustment.

In order to ensure, in the unlocked condition, radially directed movements of the base jaw, and to prevent any undesired contact with or hitting of the associated lathe, in accordance with another embodiment of the invention, the control bolts extend into the guides for the control pieces in the chuck base, and this applies when the assembly is in the unlocked condition, i.e. the shaft has been rotated in the direction towards unlocking. Thus, movements of the base jaws are precluded.

In accordance with a preferred embodiment of the invention, the connection between each base jaw and the associated mounting jaw provides a simple radial adjustment of the mounting jaw along the base jaw when the base jaw and the associated mounting jaw are mutually engaged with and connected to one another in an interfitting relationship by teeth, i.e. by way of teeth in adjacent sides or flanks.

The mounting jaw for a base jaw can then be radially shifted and aligned using the lock retainer which is formed by a groove of T-shaped cross section, and which extends in the direction of displacement of the mounting jaw at the base jaw. The transversely extending portion of the groove profile forms the inclined formation of the lock retainer, but it is also adapted to retain the lock head.

Each clamping jaw can be provided with a pair of the described shafts, and these are generally disposed in the adjustment direction of the mounting jaw at the base jaw, and at a distance adjacent to one another. Each shaft cooperates with a separate control bolt; and each control bolt is provided with associated control pieces and push rods. Such a dual shaft assembly ensures a particularly positive and strong connection of the mounting jaw at the respective mounting jaw. This is true even when using large jaw components, large considered in the radial direction of the chuck assembly, and/or the jaw components are to be adjusted using relatively lengthy adjustment distances. Tilting or tipping movements will be precluded even in the presence of very large clamping forces.

The chuck jaw replacing apparatus can include a mounting jaw support or carrier which is adjustable as to position against the end face of the chuck assembly. Each carrier has a holder for respective mounting jaw. This apparatus can have two operational sides (say a right side A, and a left side B), each with a set of holders for the mounting jaws. The carrier can be selectively positioned with the one or the other operational side against the end face of the chuck.

On the one operational side (say side B) there are provided actuating pins or fingers for exclusively actuating he push rods which provide for locking of the shaft, respective on the one side of the clamping jaw; and at the other operational side (say side A) there are provided actuating shafts for exclusively actuating the push rods which provide for unlocking of the shaft.

It is preferred in this apparatus that, in the forward or supply direction of the carrier, i.e. in the direction towards the chuck, the actuating pins are respectively rigid. However, the holders are resiliently arranged at the mounting jaw support or carrier, and they are subjected to the reset or restoring force of a spring or similar biasing element.

The actuating pins and the holders, when considered in the forward or supply direction of the carrier, i.e. in the direction towards the forward face of the chuck, are respectively arranged in such a way that the holders extend somewhat ahead of the actuating pins, but that they can nevertheless—when the mounting jaws mounted in the holders contact the base jaws—to be retracted. Retraction is in the opposition to the force of the respective restoring spring, while the carrier per se and with the pins, is brought still closer against the chuck so as to effect the full stroke of the push rods.

One advantage of the carrier is that with only one supply or feeding motion of the carrier the mounting jaws are handled, and the push rods are actuated for the locking and unlocking motions of the shafts which connect the mounting jaws and the base jaws.

For unlocking and removing of the mounting jaws from the base jaws, one operational side is used (say side A). For attaching and securing the mounting jaws at the base jaws the other operational side (say side B) is used. The actuating pins arranged on the respective operational side, will actuate only the push rods positioned on this side in the chuck and which carry out the respective locking or unlocking function.

BRIEF DESCRIPTION OF THE DRAWING

The above and other objects, features and advantages of the present invention will become more readily apparent from the following description, reference being made to the accompanying drawing, in which.

SPECIFIC DESCRIPTION

Figure 1:
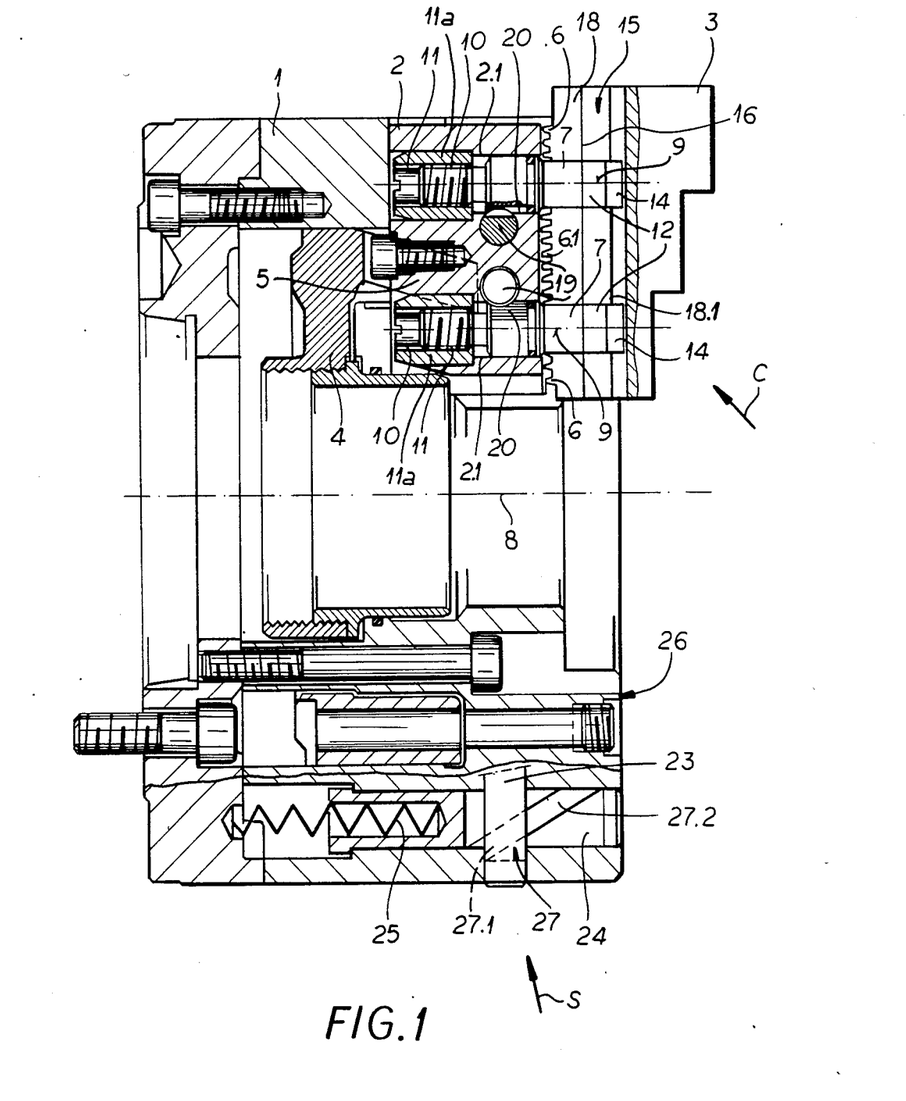
FIG. 1 is an axial-sectional view of a chuck according to the invention.
Figure 2:
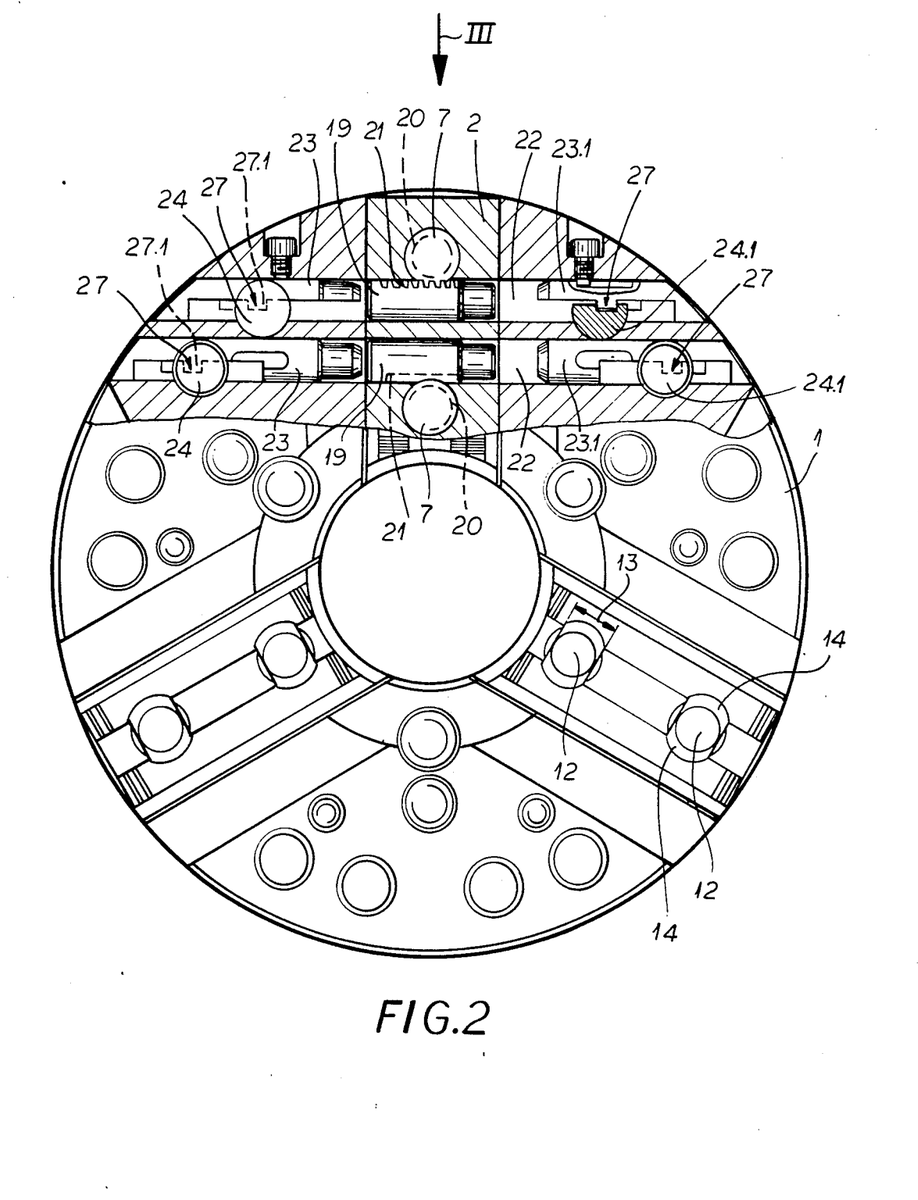
FIG. 2 is a partial cross-sectional view, from the forward end, of the embodiment shown in FIG. 1.
Figure 3:
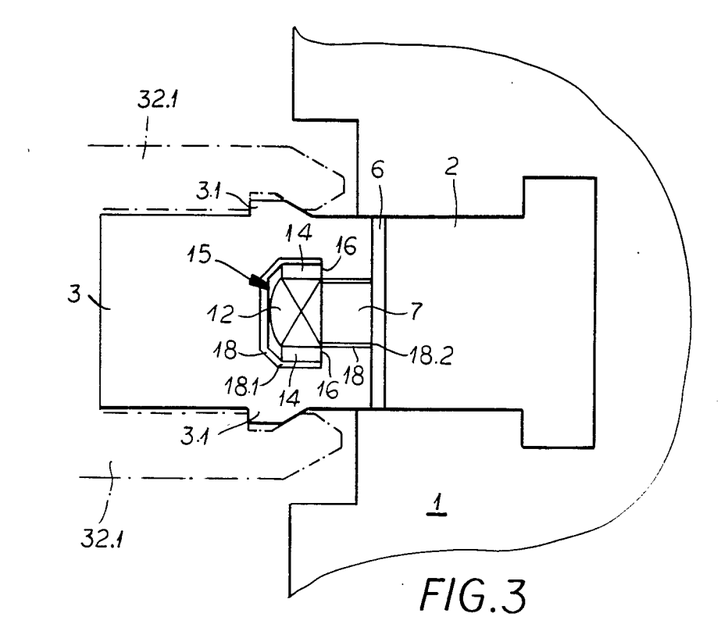
FIG. 3 is a top plan view of the chuck of FIG. 2 in the direction of the arrow III in FIG. 2.

The power chuck S shown in FIGS. 1 to 3 has radially adjustable clamping jaws C, each of which includes a base jaw 2 guided in a chuck base 1 which base jaw 2 can be powered or driven, and includes a mounting jaw 3 attached at the forward end face of the respective jaw 2.

Motive power of the three base jaws 2 is by way of a drive element or drive ring 4 and a customary wedge/hook-type connection or wedge-type transmission, generally identified by reference numeral 5, see the aforementioned applications. Of course other means of actuating or for providing motive power-transmission for the actuation of the base jaws 2 can be used within the scope of this invention.

The mounting jaws 3 are attached on the base jaws 2 so that they can be exchanged or replaced. Thus, as is indicated in the drawing, a base jaw 2 and the associated mounting jaw 3 are joined by way of gear-type teeth, with the teeth of base jaw 2 indicated by the reference number 6.1 in the forward end face thereof and the mounting jaw 3 having teeth 6 in the associated rearward end face. The teeth extend generally in the direction transverse to the operational direction of the base jaws 2.

When not securely attached at the base jaw 2, the mounting jaw 3, using the teeth 6 as guides, can be displaced, a radial direction, with respect to the base jaw 2. When they have been moved or shifted, the respective mounting jaw 3 can be secured again. Thus, the effective reach or diameter of the chuck can be selectively varied without a corresponding change of the base jaw over a rather wide range.

The attachment or joining of a mounting jaw 3 at the respective base jaw 2 includes two shafts 7 disposed in two openings 2.1 formed in jaw 2. The central longitudinal axis 9 of each one of these shafts 7 extends generally parallel to the central longitudinal axis 8 of the power chuck S.

As can be seen in FIGS. 1 and 2, the shafts 7, also referred to as pinion shafts, are aligned at a distance with respect to one another on the radial axis along which the respective mounting jaw 3 can be reset for adjustment of the desired reach or operative diameter of the chuck.

Each shaft 7 has a threaded end, with male-type screw threads, generally identified by reference numerals 10, which cooperate with a matching bore of a bushing 11a in the base jaw 2. The bushing 11a has internal female-type screw threads, generally identified by reference numeral 11.

The other end of the pinion shaft 7 has a lock head 12. The configuration of this lock head 12 is such that it is narrower—when considered in the direction transverse to the axis 9 of the shaft 7, as indicated by the dimensional arrow designated by reference numeral 13 in FIG. 2, at the 4 o'clock position—than the balance thereof. Thus in the perpendicularly extending direction, it is wider and forms a locking shoulder 14. This lock shoulder 14 extends sufficiently outwardly above the outline and can engage a lock retainer 15 in the mounting jaw 3 (see FIGS. 1 and 3).

As indicated by the embodiment shown in FIG. 2, the shaft 7 is in a locked position. Rotation of the shaft 7 through 90° will allow a corresponding unlocked position. Thus, the lock head 12 can be inserted in an axial direction and inserted into the retainer 15 on corresponding rotation of the shaft 7. The lock head 12 in the rotation-position of the shaft 7 which corresponds to the locked position, can engage with its lock shoulder 14 against a dovetail formation 16, see particularly FIG. 3, in axial and positive locking manner.

The lock formation or retainer 15 is formed by the T-shaped groove 18 extending in the direction of adjustment, i.e. generally in the longitudinal direction of the mounting jaw 3 in the rearward side or end face thereof, in which are also formed its teeth 6. The groove 18 is open, with the mouth 18.2 being shown in FIG. 3. The transversely extending portion 18.1 of the T-shaped groove 18 provides lateral walls at which the lock shoulders 14 can contact in an axial and positively locking manner when the shaft 7 is rotated within the female-type screw threads 11, from the unlocked into the locked position, i.e. by 90°, about its longitudinal central axis 9.

In addition, each shaft 7 is formed at its central section which extends in the base jaw 2 with gear-wheel type teeth 20.

Each shaft 7 has a cooperating control bolt 19 (FIGS. 1 and 2). Each control bolt 19 extends perpendicularly with respect to the longitudinal central axis 9, and each can be moved in the base jaw 2. Each control bolt 19 has a section with gear-rack type teeth 21 which extend substantially perpendicularly with respect to the teeth 20 of the respective shaft 7. Accordingly, when a control bolt 19 is shifted in its longitudinal direction, there is a corresponding rotation of the associated shaft 7. The length of the control bolt 19 is at most equal to the width of the base jaw 2 when considered in the direction of its displacement. The relative dimensions and conditions are selected in such a way that the control bolt 19—when the shaft 7 is in the locking position—is fully within the base jaw 2, as indicated in FIG. 2, and the position of the base jaw 2 can be radially adjusted without interference by the associated control bolts 19.

When the shaft 7 has been rotated so that it is in the unlocked position, the respective control bolts 19 can enter into the passages or guide openings 22 for the associated control pieces or bars 23.1, and they preclude radially directed movements of the base jaws 2. This situation can be used, by way of suitable safety controls, not shown, to preclude undesired contact of the lathe tool and the chuck, respectively.

The direction of movement of the control bolts 19 is substantially perpendicular with respect to the direction of movement of a base jaw 2 and perpendicularly with respect to the central longitudinal axis 8.

The locking and unlocking movements of the control bolts 19 are effected by control pieces or control bars 23.1 which are arranged in the mentioned guides 22 on either side of a base jaw 2. The control bars 23.1 are axially aligned with the control bolts 19, and they can be longitudinally moved, in turn, by push rods 24 ad 24.1 in the chuck base or chuck body 1.

For displacing base jaw 2 in an axial direction in the chuck base 1, the push rods 24.1 can be actuated against the force of reset or restoring spring 25, from the exterior of the chuck base 1, that is from the end face 26 at which are carried the jaw components 2 and 3. A pair comprised of a control bar 23.1 and a push rod 24.1 is in operative engagement by way of a wedge-type transmission or similar means for transferring motive power. As generally indicated in FIG. 2, the transmission 27 includes an engaging end or similar tooth-like formation 27.1 which can engage in the matching groove 27.2 formed in the push bar 24.1.

The transmission 27 is responsible for a rotary displacement by 90° along the longitudinal direction of the push rod 24 and 24.1, and at the same time provides—by way of the inclination of the tooth 27.1 and the matching groove 27.2—a respective correlation of the control distance and the attendant forces arising between push rods 24 and 24.1 and control pieces 23.

For each one of the two shafts 7 of a base jaw 2 or mounting jaw 3, there are provided separate control pieces 23 and push rods 24.

Actuation of the right-hand side push rods 24.1, i.e. those shown in FIG. 2 in a sector on the right-hand side of the base jaw 2, and which serves to lock the jaws 2 and 3 together. Actuation of the left-hand push rods 24, those in another sector offset by an angle of 120° from the first sector, serves to unlock the connection between the base jaw 2 and the mounting jaw 3.

Figure 4:
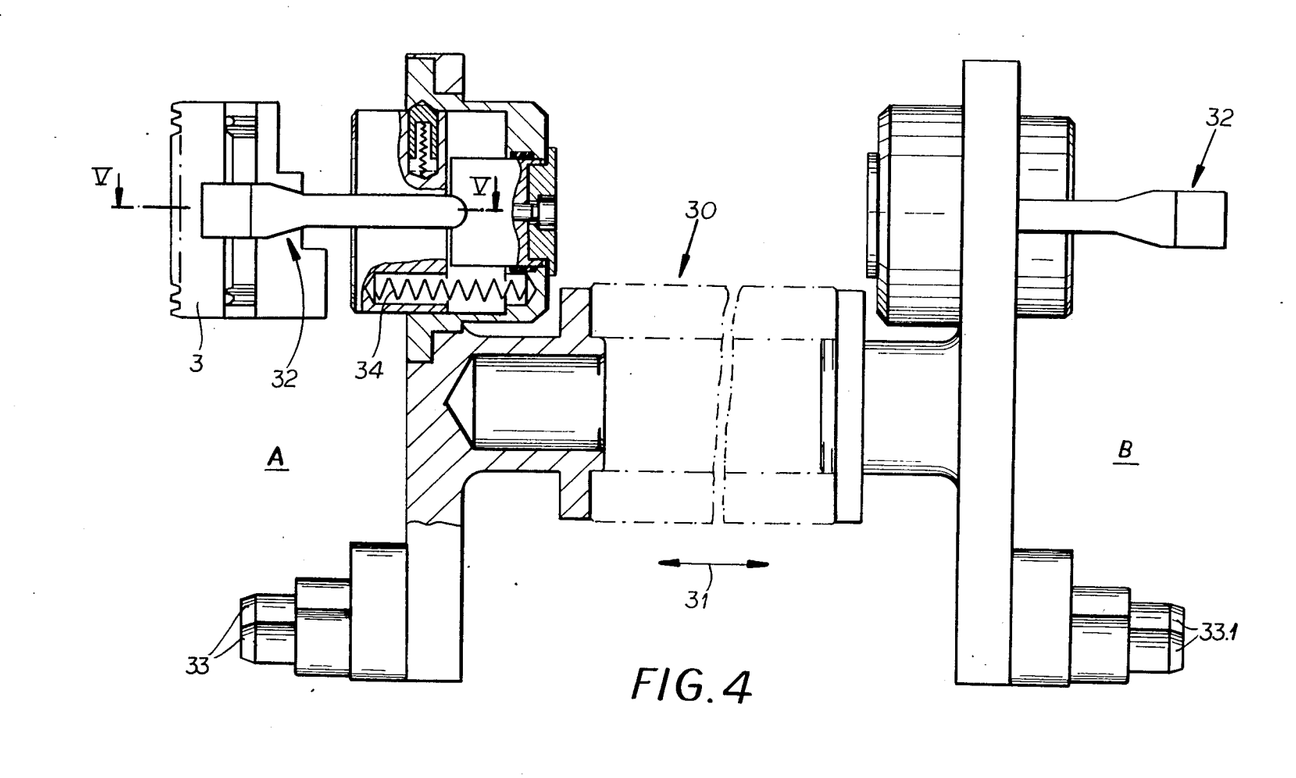
FIG. 4 is a longitudinal cross-sectional view of a carrier of a jaw exchange apparatus.

The automated jaw replacement or exchange is done with a jaw exchange apparatus of which there is shown in FIG. 4 only the jaw carrier or mounting jaw support 30. The carrier 30 can be moved or adjusted with reference to the forwardly directed end face 26 of the clamping jaw C.

The apparatus has two operational sides or ends, or can be operated in corresponding phases, namely, right-hand side B and left-hand side A, with side B being disposed at 180° with respect to side A. The apparatus can be rotated so that selectively side A or B is positioned at the forward end face 26 of the chuck S.

The carrier 30 is capable of retaining a full set of mounting jaws 3, i.e. holds three mounting jaws 3 on each side A and B supported by a holder 32.

The carrier 30 is also provided with actuating pins or fingers 33 and 33.1, or similar elements, which are adapted to actuate the corrsponding push rods 24 and 24.1 in the chuck S.

The operational side B in FIG. 4 has actuating pins 33.1 which effect only actuation of the corresponding push rods 24.1 which serve to lock the associated shafts 7, i.e. the push rods 24.1 on the right-hand side of the base jaw 2 (see FIG. 2). Similarly, the operational side A of the carrier 30 has pins 33 which are arranged in such a way that they will actuate only the push rods 24 on the left-hand side of the base jaw 2 (see FIG. 2).

In the direction of introduction or mounting of the jaws 3, see arrow 31 in FIG. 4, the pins 33 are respectively rigid, but the holders 32 can be displaced and they are resiliently disposed on the carrier 30 against the force of a reset spring 34.

Thus, when the carrier 30 is advanced towards the end face 26 with the operational side B thereof, with mounting jaws 3 being retained in the holders 32, and none being present on the associated base jaws 2, the mounting jaws 3 initially engage with their teeth 6.1 in the matching teeth 6 of the base jaws 2.

On further advance of the carrier 30, the holders 32 are retracted, against the force of the springs 34 and relative to the carrier 30, while the carrier 30 and with it the actuating pins 33.1, advances further against the chuck S, for moving the push rods 24.1 through their respective full strokes which effect the locking of the jaws 2 and 3.

The removal of the mounting jaws 3 is done by rotating the carrier 30 so that the operational side A is directed towards the end face 26 while the holders 32 are still empty. On further axial advancement, the holders 32 firstly contact the mounting jaws 3 which are still locked at the base jaws 2.

The holders 32 then retract, against the force of the reset springs 34, and on further axial advancement of the carrier 30, the actuating pins 33 engage the left-hand push rods 24 which effect the described unlocking of the jaws 2 and 3.

The mounting jaws 3 are retained in the holder 32 between a pair of holding arms 32.1, with the pivot ends thereof being maintained under the force of a spring 35 exerting pressure to maintain the holding arms 32.1 in their gripping condition.

Figure 5:
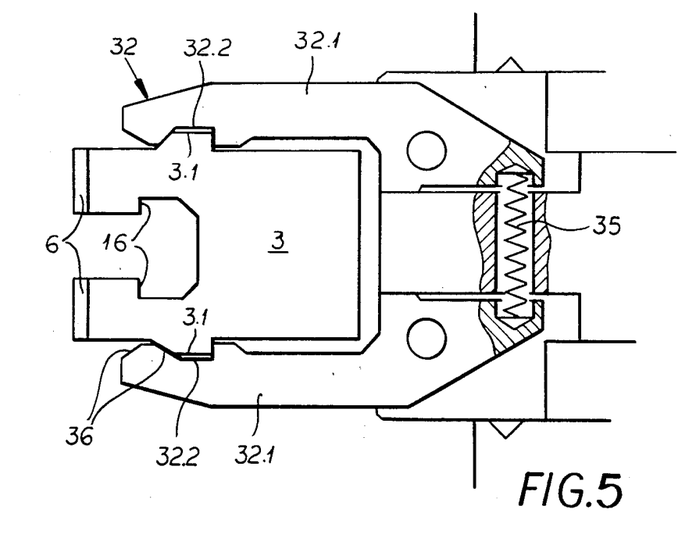
FIG. 5 is a cross-section along line V—V in FIG. 4.

As will be appreciated with reference to FIG. 5, a more secure retention of the mounting jaws 3 is achieved by an embodiment wherein the mounting jaws 3 are formed with laterally projecting elongated bars or formations 3.1 extending the length of the jaw 3 and which can be inserted in matching grooves 32.2 of the holding arms 32.1.

The holding arms 32.1, the gooves 32.2, and the bars 3.1 have inclined surfaces 36 so that the holder 32—under temporary compression of the spring 35 which exerts operative pressure on the holding arms 32.1—can be pulled from the mounting jaw 3. This can be done either when the mounting jaws 3 are held at the base jaws 2, or when they are retained in their storage magazine, not shown, and the holder 32 is automatically removed from the mounting jaw 3.

Conversely, the holding arms 32.1 of the holder 32 can be spread for gripping of a mounting jaw 3, in the opposite direction to reach over the mounting jaw 3, whereby the holding arms 32.1 are spread, against the force of the spring 35, until the lateral bars 3.1 are engaged in the grooves 32.2 of the holding arms 32.1.

I claim:

1. A power chuck comprising:
   a chuck base provided with a chuck drive;
   a plurality of clamping jaws, each clamping jaw including
   a base jaw guided in said chuck base, and formed with at leats one connecting opening with internal screw threads,
   a respective mounting jaw releasably secured in interfacing relationship at a respective end face of a repsective one of said base jaws and formed with at least one lock retainer, and
   at least one shaft disposed in said opening for respectively connecting each base jaw with its mounting jaw;
   said shaft extending substantially parallel to a central longitudinal axis of the power chuck;
   said shaft being rotatable between a lock position in which a respective mounting jaw is positively secured to its base jaw, and into an unlocked position in which the respective mounting jaw can be released from its base jaw for displacement in an adjustment direction;
   said shaft having a first end, an intermediate section, and a second end, said first end being formed with external screw threads engageable with the internal screw threads of said connecting opening in a respective base jaw;
   said intermediate section being formed with a plurality of gear teeth disposed circumferentially as a pinion, said intermediate section extending into a respective base jaw;
   a lock head being formed at said second end of each shaft and having at least one lock shoulder which extends therefrm, said lock head being adapted to axially enter into the associated lock retainer in a respective mounting jaw when said shaft is in the unlocked position, whereby upon rotation of said shaft into the locked position said lock head can engage with its lock shoulder against a dovetail of an elongated T-shaped formation of said lock retainer, thereby positively securing said base jaw and said mounting jaw together;
   a control bolt for said shaft, said control bolt having a central longitudinal axis extending transversely with respect to the central longitudinal axis of said shaft and being shiftable transversely thereto, said control bolt having a plurality of rack-forming teeth meshing with said pinion;
   guided control pieces for shifting a respective control bolt in the chuck base, with at least one control piece being provided on either side of the respective base jaw, said control pieces being axially algined with respect to the control bolt and being adapted for the longitudinal displacement thereof;
   push rods disposed in said chuck and adapted to be actuated from the exterior thereof against the force of respective reset springs for the control pieces, said push rods being axially guided in said chuck; and
   a wedge-type transmissions for operatively connecting a respective push rod and control piece.

2. The power chuck defined in claim 1 wherein said clamping jaws are radially movable in the adjustment direction.

3. The power chuck defined in claim 1 wherein said control bolt has a length which is at most equal to the width of the respective base jaw when considered in the direction transverse to the chuck axis.

4. The power chuck defined in claim 1 wherein in the unlocked position of said shaft, the respective control bolts extend into guide formations for respective control pieces formed in the associated chuck base.

5. The power chuck defined in claim 1 wherein said T-shaped formation extends along a radius of said chuck in the direction of displacement of the mounting jaw at the base jaw, whereby a transversely extending portion of the formation profile forms the dovetail of the lock retainer.

6. The power chuck defined in claim 1 wherein each base jaw has forwardly directed teeth.

7. The power chuck defined in claim 1 wherein each mounting jaw has rearwardly directed teeth.

8. The power chuck defined in claim 1 wherein for each clamping jaw a pair of shafts are provided, said shafts of each jaw being parallel to one another and aligned in the adjustment direction of a mounting jaw at the associated base jaw and at a distance from one another, and wherein for each shaft a separate control bolt with separate control pieces and push rods are provided.

9. The power chuck defined in claim 1 wherein the drive for said chuck base is a step-control drive.

10. The power chuck defined in claim 1 wherein said lock head is cylindrical and formed with a pair of flats disposed diameterically opposite and parallel to one another and defining two diametrically oppoiste lock shoulders 90° offset from said flats, whereby in the unlocked position of said shaft said flats are parallel to said elongated T-shaped formation and said lock head can be inserted therein and turned through 90°, whereby said lock shoulders extend transverse to said T-shaped formation and can engage the dovetail thereof, defining the locked position of said shaft.

11. In a power chuck having radially operating clamping jaws, each of which includes a base jaw guided in a chuck base adapted to be driven, and includes a mounting jaw releasably secured at the end face of said base jaw, and includes at lest one shaft which connects a base jaw and its mounting jaw, wherein the central longitudinal axis of said shaft extends substantially poarallel to a longitudinal central axis of the chuck, the improvement which comprises:
   that said at least one shaft is rotatably mounted for locking and unlocking positions, and having formed at one end thereof male-type screw threads for guiding this end in female-type screw threads of a repsective base jaw, and said shaft having a lock head at its other end, said lock head having a cylindrical confirugation whcih includes a pair of flats disposed diametrically opposite and parallel to one another and defining two diametrically opposite lock shoulders 90° offset from said flats and extending outwardly above the outline of said shaft, whereby in the unlocked position of said shaft said flats are parallel to an elongated T-shaped lock retainer formd in said mounting jaw and said lock head can be axially inserted therein and turned through 90°, whereby said lock shoulders extend transverse to said lock retainer and can engage a dovetail formation therein, defining the locked position of said shaft and said lock head being retained in axially and positively locking manner in said dovetail formation;

that said at least one shaft extends in its base jaw with a central section having teeth of a pinion-type gear wheel;

that a control bolt has a longitudinal axis which extends transversely to the longitudinal central axis of said chuck, said control bolt being adapted to be shifted longitudinally along the axis thereof, said control bolt having teeth of a gear rack extending transversely with respect to the teeth of said central section for cooperatively meshing engagement therewith, with the length of said control bolt being at most equal to the width of the respective base jaw when considered in the direction transverse to the chuck axis;

that for shifting of the control bolt in the chuck base, on both sides of the base jaw there are provided longitudinally displacable guided control pieces which are axailly aligned with the respective control bolt when considered in its direction of displacement, and that said control pieces are actuated by means of push rods axially guided in the chuck base and operable from the exterior of the chuck base against the force of reset springs disposed in said chuck base; and that the push rods and the control pieces are operatively connected by means of a wedge-type transmission.

* * * * *